(12) United States Patent
Hooker et al.

(10) Patent No.: US 8,533,438 B2
(45) Date of Patent: Sep. 10, 2013

(54) STORE-TO-LOAD FORWARDING BASED ON LOAD/STORE ADDRESS COMPUTATION SOURCE INFORMATION COMPARISONS

(75) Inventors: Rodney E. Hooker, Austin, TX (US); Colin Eddy, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 786 days.

(21) Appl. No.: 12/781,274

(22) Filed: May 17, 2010

(65) Prior Publication Data
US 2011/0040955 A1    Feb. 17, 2011

Related U.S. Application Data

(60) Provisional application No. 61/233,259, filed on Aug. 12, 2009.

(51) Int. Cl.
*G06F 9/312* (2006.01)
(52) U.S. Cl.
USPC .......................................... 712/225; 712/216
(58) Field of Classification Search
None
See application file for complete search history.

(56) References Cited

U.S. PATENT DOCUMENTS

| | | | | |
|---|---|---|---|---|
| 5,619,662 | A * | 4/1997 | Steely et al. | 712/216 |
| 6,065,103 | A * | 5/2000 | Tran et al. | 711/156 |
| 6,463,523 | B1 * | 10/2002 | Kessler et al. | 712/216 |
| 6,463,524 | B1 * | 10/2002 | Delaney et al. | 712/221 |
| 6,622,237 | B1 * | 9/2003 | Keller et al. | 712/216 |
| 6,845,442 | B1 * | 1/2005 | Lepak et al. | 712/214 |
| 7,222,226 | B1 | 5/2007 | Lepak et al. | |
| 2002/0141426 | A1 * | 10/2002 | Tanaka et al. | 370/412 |
| 2004/0044881 | A1 * | 3/2004 | Maier et al. | 712/218 |
| 2008/0307173 | A1 * | 12/2008 | Yeh et al. | 711/157 |
| 2010/0205384 | A1 | 8/2010 | Beaumont-Smith et al. | |

OTHER PUBLICATIONS

Subramaniam, S etal., Fire-and-Forget: Load/Store Scheduling with No Store Queue at All, 2006, IEEE, 12 pages.*
Sethumadhavan, S., etal., Late-Binding Unordered Load-Store Queues, 2007, ACM, 11 pages.*
Subramaniam, Samantika et al. "Fire-and-Forget: Load/Store Scheduling with No Store Queue at All." pp. 1-12. Downloaded from http://www.lems.brown.edu/cad/en292s10/papers/fire-forget-micro06.pdf. Downloaded Oct. 15, 2009.

* cited by examiner

*Primary Examiner* — Eric Coleman
(74) *Attorney, Agent, or Firm* — E. Alan Davis; James W. Huffman (57) ABSTRACT

A microprocessor includes a queue comprising a plurality of entries each configured to hold store information for a store instruction. The store information specifies sources of operands used to calculate a store address. The store instruction specifies store data to be stored to a memory location identified by the store address. The microprocessor also includes control logic, coupled to the queue, configured to encounter a load instruction. The load instruction includes load information that specifies sources of operands used to calculate a load address. The control logic detects that the load information matches the store information held in a valid one of the plurality of queue entries and responsively predicts that the microprocessor should forward to the load instruction the store data specified by the store instruction whose store information matches the load information.

24 Claims, 8 Drawing Sheets

STORE-TO-LOAD FORWARDING BASED ON LOAD/STORE ADDRESS COMPUTATION SOURCE INFORMATION COMPARISONS

CROSS REFERENCE TO RELATED APPLICATION(S)

This application claims priority based on U.S. Provisional Application Ser. No. 61/233,259, filed Aug. 12, 2009, entitled STORE-TO-LOAD FORWARDING BASED ON LOAD/STORE ADDRESS COMPUTATION SOURCE INFORMATION COMPARISONS, which is hereby incorporated by reference in its entirety.

FIELD OF THE INVENTION

The present invention relates in general to the field of microprocessors, and particularly to store-to-load forwarding therein.

BACKGROUND OF THE INVENTION

Programs frequently use store and load instructions. A store instruction moves data from a register of the processor to memory, and a load instruction moves data from memory to a register of the processor. Frequently microprocessors execute instruction streams where one or more store instructions precede a load instruction, where the data for the load instruction is at the same memory location as one or more of the preceding store instructions. In these cases, in order to correctly execute the program, the microprocessor must ensure that the load instruction receives the store data produced by the newest preceding store instruction. One way to accomplish correct program execution is for the load instruction to stall until the store instruction has written the data to memory (i.e., system memory or cache), and then the load instruction reads the data from memory. However, this is not a very high performance solution. Therefore, modern microprocessors transfer the store data from the functional unit in which the store instruction resides (e.g., a store queue) to the functional unit in which the load instruction resides (e.g., a load unit). This is commonly referred to as a store forward operation or store forwarding or store-to-load forwarding.

In order to detect whether it needs to forward store data to a load instruction, the microprocessor compares the load memory address with the store memory addresses of older store instructions to see whether they match. For strict accuracy, the microprocessor needs to compare the physical address of the load with the physical address of the stores. However, translating the load virtual address into the load physical address takes time. So, in order to avoid delaying the address comparison, a modern microprocessor compares the load virtual address with the older store virtual addresses in parallel with the translation of the load virtual address to the load physical address and store forwards based on the virtual address comparison. The microprocessor then performs the physical address comparison to verify that the store forwarding based on the virtual address comparison was correct or to determine the forwarding was incorrect and correct the mistake by replaying the load.

Furthermore, because a compare of the full virtual addresses is time consuming (as well as power and chip real estate consuming) and may affect the maximum clock frequency at which the microprocessor may operate, modern microprocessors tend to compare only a portion of the virtual address, rather than comparing the full virtual address. This may cause increased false store collision detections and increased incorrect forwarding. One solution to this problem is described in U.S. patent application Ser. No. 12/197,632 (CNTR.2405), filed Aug. 25, 2008, which is hereby incorporated by reference. However, more accurate ways of detecting store collisions for the purpose of store forwarding are still needed.

Additionally, the time required to perform store forwarding using the virtual address comparison-based scheme may be hidden by the virtual-to-physical address translation time (i.e., TLB lookup time) and the cache tag and data array lookup time. However, if that becomes no longer true, then what will be needed is an alternate way to detect store collisions for the purpose of store forwarding.

Finally, the virtual address comparison-based store collision detection scheme requires a relatively large number of address comparators, which consume a relatively large amount of space on the microprocessor die and power. Therefore, what is needed is a more die real estate and power consumption efficient way to detect store collisions for the purpose of store forwarding.

BRIEF SUMMARY OF INVENTION

In one aspect the present invention provides a microprocessor. The microprocessor includes a queue comprising a plurality of entries each configured to hold store information for a store instruction. The store information specifies sources of operands used to calculate a store address. The store instruction specifies store data to be stored to a memory location identified by the store address. The microprocessor also includes control logic, coupled to the queue, configured to encounter a load instruction. The load instruction includes load information that specifies sources of operands used to calculate a load address. The control logic detects that the load information matches the store information held in a valid one of the plurality of queue entries and responsively predicts that the microprocessor should forward to the load instruction the store data specified by the store instruction whose store information matches the load information. Each of the plurality of entries of the queue is configured to hold a reorder buffer index of the store instruction. The control logic is configured to predict that the microprocessor should forward to the load instruction the store data specified by the store instruction whose store information matches the load information by outputting the reorder buffer index of the store instruction whose store information matches the load information.

In another aspect, the present invention provides a method for store forwarding data in a microprocessor. The method includes encountering a stream of instructions in program order. For each store instruction encountered within the stream, the method includes allocating one of a plurality of entries in a queue for the store instruction and populating the allocated entry with store information. The store information specifies sources of operands used to calculate a store address. The store instruction specifies store data to be stored to a memory location identified by the store address. The method also includes encountering a load instruction within the stream. The load instruction includes load information that specifies sources of operands used to calculate a load address. The method also includes detecting that the load information matches the store information held in a valid one of the plurality of queue entries and responsively predicting that the microprocessor should forward to the load instruction the store data specified by the store instruction whose store information matches the load information. The populating the allocated entry with store information comprises populating the allocated entry with a reorder buffer index of the store instruction. The predicting comprises outputting the reorder buffer index of the store instruction whose store information matches the load information.

In yet another aspect, the present invention provides a computer program product for use with a computing device, the computer program product comprising a computer usable storage medium having computer readable program code embodied in the medium for specifying a microprocessor. The computer readable program code includes first program code for specifying a queue comprising a plurality of entries each configured to hold store information for a store instruction. The store information specifies sources of operands used to calculate a store address. The store instruction specifies store data to be stored to a memory location identified by the store address. The computer readable program code also includes second program code for specifying control logic, coupled to the queue, configured to encounter a load instruction. The load instruction includes load information that specifies sources of operands used to calculate a load address. The control logic detects that the load information matches the store information held in a valid one of the plurality of queue entries and responsively predicts that the microprocessor should forward to the load instruction the store data specified by the store instruction whose store information matches the load information. Each of the plurality of entries of the queue is configured to hold a reorder buffer index of the store instruction. The control logic is configured to predict that the microprocessor should forward to the load instruction the store data specified by the store instruction whose store information matches the load information by outputting the reorder buffer index of the store instruction whose store information matches the load information.

DETAILED DESCRIPTION OF THE INVENTION

Embodiments are described herein that provide two basic solutions, each of which solves one or more of the problems outlined above.

A first solution compares information identifying the sources used to calculate load and store addresses, rather than comparing the addresses themselves. This solution advantageously removes the virtual address calculation from the critical path of the store forwarding determination and potentially uses fewer and/or smaller comparators, which may save die real estate and power consumption.

A second solution maintains a replay history of recent load instructions and predicts a store from which data should be forwarded to a load based on the replay history. This solution (in at least one embodiment) advantageously reduces the store-forwarding time by removing the virtual address calculation time from the store forwarding determination path and by comparing a smaller number of bits than the virtual address comparison scheme. This solution also advantageously potentially uses fewer and/or smaller comparators, which may save die real estate and power consumption. Finally, this solution potentially more accurately detects store collisions for the purpose of store forwarding than the virtual address comparison scheme.

The two solutions may also be used in combination. The two solutions will now be described.

Generally, the microprocessor 100 (see FIG. 1) performs loads speculatively. That is, the microprocessor 100 assumes cache hits on loads and allow loads to issue without dependencies on older stores that may possibly have the load data; then the microprocessor 100 replays the load if the load subsequently misses. In cases where the store address of an older store was not available to compare with the load, the load unit completes the load to the reorder buffer (ROB) 172 (see FIG. 1); however, when the older store is ready to retire, it checks the load queue and detects that there was a newer load that needed its address but didn't get it; so the ROB 172 undoes the load. That is, the load gets replayed indirectly, rather than directly in the case where the load unit detects the mistake in time to miss to the ROB 172. The load can miss because the load data simply isn't in the microprocessor 100, in which case it has to go get it from memory. Also, the load can "miss" because the load data was in the machine (store queue), but wasn't forwarded from the older store. This can occur because: (1) the microprocessor 100 didn't have the store address to compare with the load at the time the load proceeded into the load unit pipeline, so it couldn't compare addresses to detect the need to forward; (2) the microprocessor 100 detected the address collision, but it didn't have the store data yet to forward; (3) the microprocessor 100 forwarded the wrong data (either falsely detected a collision, or failed to detect a valid collision).

The first two reasons above occur because the load was allowed to issue out-of-order, i.e., before the store was issued and produced the address and data. The microprocessor 100 issues the load out-of-order because the load address is not even computed until the load reaches the load unit, so the register alias table (RAT) 134 (see FIG. 1) does not know the load address to be able to generate a dependency. That is, the RAT 134 generates dependencies based upon register operands, not upon memory operands.

In U.S. Provisional Application 61/182,283 (CNTR.2354), filed May 29, 2009, which is hereby incorporated by reference in its entirety, the microprocessor 100 attempts to ameliorate this problem by modifying the RAT 134 to create an enhanced dependency for the load to make it dependent upon the store (or some instruction upon which the store is dependent) so that the load doesn't issue until the data can be forwarded to it properly. However, this doesn't solve the third reason. That is, even if the RAT 134 causes the load to wait to be issued such that the memory subsystem at least has a chance of correctly forwarding to the load, the memory subsystem still has to correctly detect collisions and forward the correct data.

The microprocessor 100 employs two store collision detection/store forwarding prediction schemes, as discussed above, similar to two the RAT 134 uses for issue scheduling, but here for the purpose of store forwarding, rather than for scheduling the issue of loads. The address source comparison-based scheme predicts the need to store forward by comparing the sources of the load address computation with the sources of the store address computations rather than the addresses themselves, as described in detail below. The replay history-based scheme keeps a history of the instruction pointer (IP) 806 (see FIG. 8) of loads replayed for forwarding-related reasons and information identifying the store whose data should have been forwarded; when the microprocessor 100 sees the IP of the load again, it forwards from the matching store, as described in detail below.

The load issue scheduling inventions of U.S. Provisional Application 61/182,283 do not cover the cases where the memory subsystem detects that a completed load instruction received incorrect data because of the inexactness of the address compare (i.e., virtual vs. physical and/or not entire virtual address used); rather, they only cover the cases where the store address/data was not available. This is because creating the enhanced dependency would not help the address inexactness comparison situation. However, it would be helpful for store forwarding purposes to include a replay history-based embodiment to cover this situation. As described below, the forwarding replay history queue (FRHQ) 194 (of FIG. 1) activates whenever a load has to be replayed for any forwarding-related reason to cover this. It is noted that the inexactness of the address compare can produce both (1) false collision detections (i.e., virtual index/hash matches followed by physical mismatches) and (2) missed collisions (i.e., virtual index/hash mismatches followed by physical matches).

Figure 1:
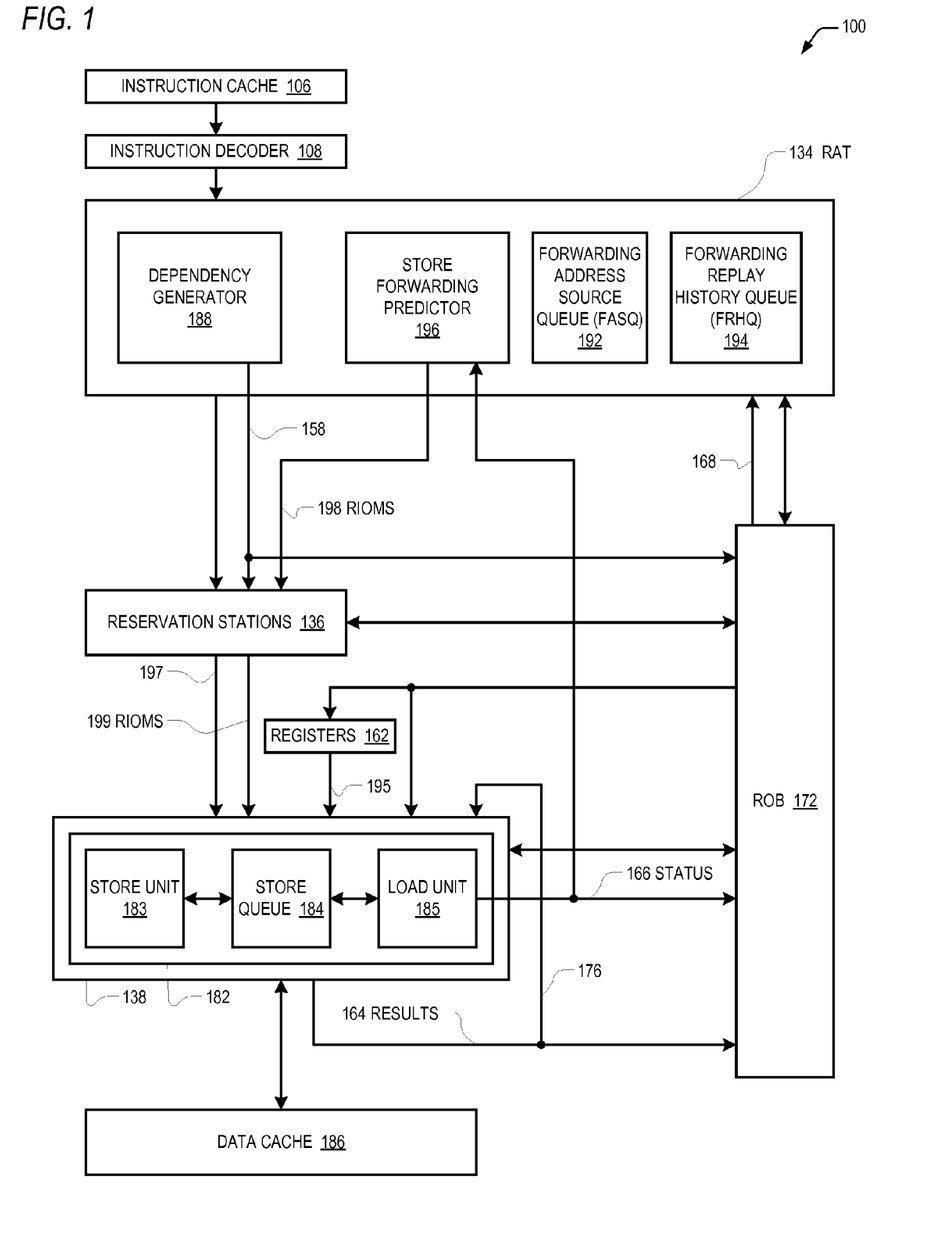
FIG. 1 is a block diagram illustrating a microprocessor according to the present invention.

Referring now to FIG. 1, a block diagram illustrating a microprocessor 100 according to the present invention is shown. In one embodiment, the macroarchitecture of the microprocessor 100 is an x86 macroarchitecture. A microprocessor has an x86 macroarchitecture if it can correctly execute a majority of the application programs that are designed to be executed on an x86 microprocessor. An application program is correctly executed if its expected results are obtained. In particular, the microprocessor 100 executes instructions of the x86 instruction set and includes the x86 user-visible register set. However, the store forwarding mechanisms described herein may be employed in microprocessors of other architectures, both existing and future.

The microprocessor 100 includes an instruction cache 106 that caches program instructions from a system memory (not shown). The microprocessor 100 also includes an instruction decoder 108 that receives instructions from the instruction cache 106 and decodes them. In one embodiment, the instruction decoder 108 includes an instruction translator that translates macroinstructions of a macroinstruction set of the microprocessor 100 (such as the x86 instruction set architecture) into microinstructions of a microinstruction set architecture of the microprocessor 100. In particular, the instruction decoder 108 translates memory access instructions, such as x86 MOV, PUSH, POP, CALL, RET, etc. instructions into a sequence of microinstructions that includes one or more load or store microinstructions, which are simply referred to herein as a load instruction or a store instruction. In other embodiments, the load and store instructions are part of the native instruction set of the microprocessor 100.

The microprocessor 100 also includes a register alias table (RAT) 134, coupled to the instruction decoder 108; reservation stations 136, coupled to the RAT 134; a reorder buffer (ROB) 172, coupled to the RAT 134 and to the reservation stations 136; execution units 138, coupled to the reservation stations 136 and the ROB 172; and architectural registers 162, coupled to the ROB 172 and to the execution units 138.

The execution units 138 include a memory subsystem 182 that includes a load unit 185 that executes load instructions, a store unit 183 that executes store instructions, and a store queue 184 that holds executed store instructions waiting to be written to memory, such as to data cache 186 coupled to the memory subsystem 182. Additionally, the memory subsystem 182 corresponds with a bus interface unit (not shown) to read and write data from and to a system memory. Although the memory subsystem 182 may receive load instructions and store instructions to execute out of program order, the memory subsystem 182 correctly resolves store collisions. That is, the memory subsystem 182 insures that each load instruction receives the correct data, in particular, from the correct store instruction (or store instructions in the case that multiple store instructions supply the data specified by a single load instruction) in the case of a store collision. More particularly, embodiments are described herein that attempt to improve the store forwarding accuracy of store data from the store queue 184 to the load unit 185. If necessary, the memory subsystem 182 generates a replay indicator on a status signal 166 to the ROB 172 to request the ROB 172 to replay a load instruction to insure that it receives the correct data. The load unit 185 also internally replays load instructions when necessary. The execution units 138 also include other execution units (not shown), such as integer execution units, floating point units, multimedia units, and the like, that execute non-memory access instructions.

The RAT 134 receives the decoded instructions from the instruction decoder 108 in program order and determines the dependencies of each instruction on other unretired instructions in the microprocessor 100. The RAT 134 stores register renaming information associated with each unretired instruction in the microprocessor 100. The register renaming information incorporates the program order of the instructions. Additionally, the RAT 134 includes a complex state machine that controls various actions of the microprocessor 100 in response to the renaming information and its other inputs, as described herein.

The RAT 134 includes a dependency generator 188 that generates dependency information 158 for each instruction based on its program order, on the operand sources it specifies, and on the renaming information. The dependency information 158 includes an identifier for each input operand of the instruction, namely an identifier of the dependee instruction upon which the input operand depends, if any. In one embodiment, the identifier is an index into the ROB 172 that identifies an entry in the ROB 172 that stores the dependee instruction and status information related thereto, discussed below.

The RAT 134 includes a store forwarding predictor 196 that predicts when a load instruction collides with an older store instruction such that it needs to have store data forwarded to it from the older store. In particular, the RAT 134 generates the ROB index of the predicted older store instruction, referred to herein as the ROB index of matching store (RIOMS) 198. The RAT 134 provides the RIOMS 198 to the reservation stations 136 along with the load instruction and dependency information 158.

The RAT 134 includes a plurality of queues that the RAT 134 employs to make the store forwarding predictions. The queues include a forwarding address source queue (FASQ)

192 and a forwarding replay history queue (FRHQ) 194, for which the entries of each are described in more detail below with respect to FIGS. 4 and 8, respectively.

The RAT 134 dispatches the decoded instructions and their associated dependency information 158 and the RIOMS 198 to the reservation stations 136. Prior to dispatching an instruction, the RAT 134 allocates an entry in the ROB 172 for the instruction. Thus, the instructions are allocated in program order into the ROB 172, which is configured as a circular queue. This enables the ROB 172 to guarantee that the instructions are retired in program order. The RAT 134 also provides the dependency information 158 to the ROB 172 for storage in the instruction's entry therein. When the ROB 172 replays an instruction, such as a load instruction, the ROB 172 provides the dependency information stored in the ROB entry to the reservation stations 136 during the replay of the instruction.

The reservation stations 136 include queues that hold the instructions and dependency information 158 and the RIOMS 198 received from the RAT 134. The reservation stations 136 also include issue logic that issues the instructions from the queues to the execution units 138 when they are ready to be executed. The execution units 138 may receive the results 164 of executed instructions via the architectural registers 162, via temporary registers (not shown) in the ROB 172 to which the architectural registers 162 are renamed, or directly from the execution units 138 themselves via forwarding paths 176. The execution units 138 also provide their results 164 to the ROB 172 for writing into the temporary registers.

The memory subsystem 182 resolves, i.e., computes, load addresses for load instructions and resolves store addresses for store instructions using the source operands specified by the load and store instructions. The sources of the operands may be the architectural registers 162, constants, and/or displacements specified by the instruction. The memory subsystem 182 also reads load data from the data cache 186 at the computed load address. The memory subsystem 182 also writes store data to the data cache 186 at the computed store address.

As mentioned above, in some circumstances the memory subsystem 182 must request a replay of a load instruction, which it indicates via the status signal 166 that is provided to the ROB 172. The status signal 166 specifies the ROB index of the instruction that must be replayed, such as a load instruction, so that the ROB 172 can update the indexed entry with an indication of the status of the instruction, including whether a replay is needed. In one embodiment, the status signal 166 also specifies the ROB index of the store instruction whose data should have been forwarded to the load instruction. These ROB indexes of the status signal 166 are also provided to the store forwarding predictor 196, which enables it to calculate a delta between the two ROB indexes, as discussed more below. When an instruction whose ROB entry is marked as needing to be replayed is next to be retired, i.e., is the oldest unretired instruction, the ROB 172 replays the instruction. That is, the ROB 172 re-dispatches the instruction and its associated dependency information 158 from the ROB 172 to the reservation stations 136 to await subsequent re-issuance to the execution units 138 and re-execution thereby. In one embodiment, the ROB 172 replays not only the instruction, but also replays all instructions that depend upon the result of the instruction. When the ROB 172 replays a load instruction, the ROB 172 also signals this event to the RAT 134 via the status signal 168. The status signal 168 specifies the ROB index of the load instruction being replayed.

Figure 2:
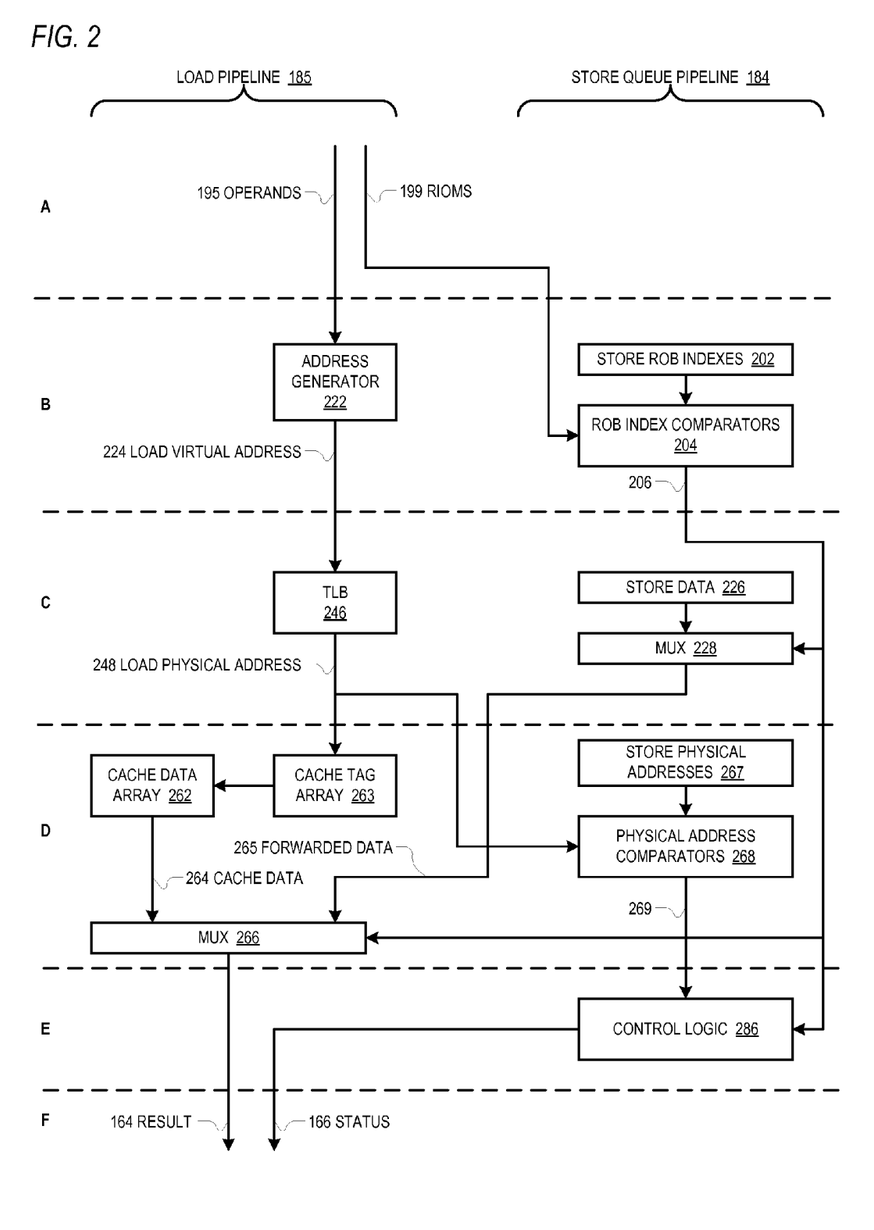
FIG. 2 is a block diagram illustrating in detail the pipelines of the load unit and store queue of the microprocessor of FIG. 1.

Referring now to FIG. 2, a block diagram illustrating in detail the pipelines of the load unit 185 and store queue 184 of the microprocessor 100 of FIG. 1 is shown. In the embodiment of FIG. 2, each pipeline includes six stages, denoted A through F. In the A stage, the load pipeline 185 receives the load instruction address operands 195 and the RIOMS 198.

In the B stage, an address generator 222 of the load pipeline 185 generates the load virtual address 224 from the operands 195. Each entry of the store queue 184 holds the ROB index 202 of the store instruction to which the entry is allocated. A plurality of ROB index comparators 204 compares the RIOMS 198 of the load instruction with each of the store ROB indexes 202 to generate an indicator 206 of whether any of the store ROB indexes 202 matched the RIOMS 198 and, if so, which store queue 184 entry matched.

In the C stage, a translation lookaside buffer (TLB) 246 within the load pipeline 185 looks up the load virtual address 224 and outputs the translated load physical address 248. Each entry of the store queue 184 also holds the store data 226 of the store instruction to which the entry is allocated. A mux 228 in the store queue 184 pipeline receives the store data 226 from each store queue 184 entry and selects the store data 226 specified by the matching ROB index entry indicator 206 to forward as forwarded data 265 to the load pipeline 185.

In the D stage, the load physical address 248 is provided to the tag array 263 and data array 262 of the data cache 186 to obtain cache data 264. A mux 266 in the load pipeline 185 receives the cache data 264 and the forwarded data 265 from the store queue 184 and selects one of the inputs as result 164 of FIG. 1. The mux 266 selects the forwarded data 265 if so indicated by the matching entry indicator 206 and otherwise selects the cache data 264. Each entry of the store queue 184 also holds the store physical address 267 of the store instruction to which the entry is allocated. A plurality of physical address comparators 268 compares the load physical address 248 with each of the store physical addresses 267 to generate an indicator 269 of whether any of the store physical address 267 matched the load physical address 248 and, if so, which store queue 184 entry matched.

In the E stage, control logic 286 within the store queue 184 pipeline receives the matching ROB index entry indicator 206 and the physical address match indicator 269 and based thereon generates the status 166 of FIG. 1 for the load instruction. The status 166 indicates whether the load instruction completed successfully, missed, or must be replayed.

In the F stage, the result 164 and status 166 are provided to the ROB 172 and other units of the microprocessor 100.

Figure 3:
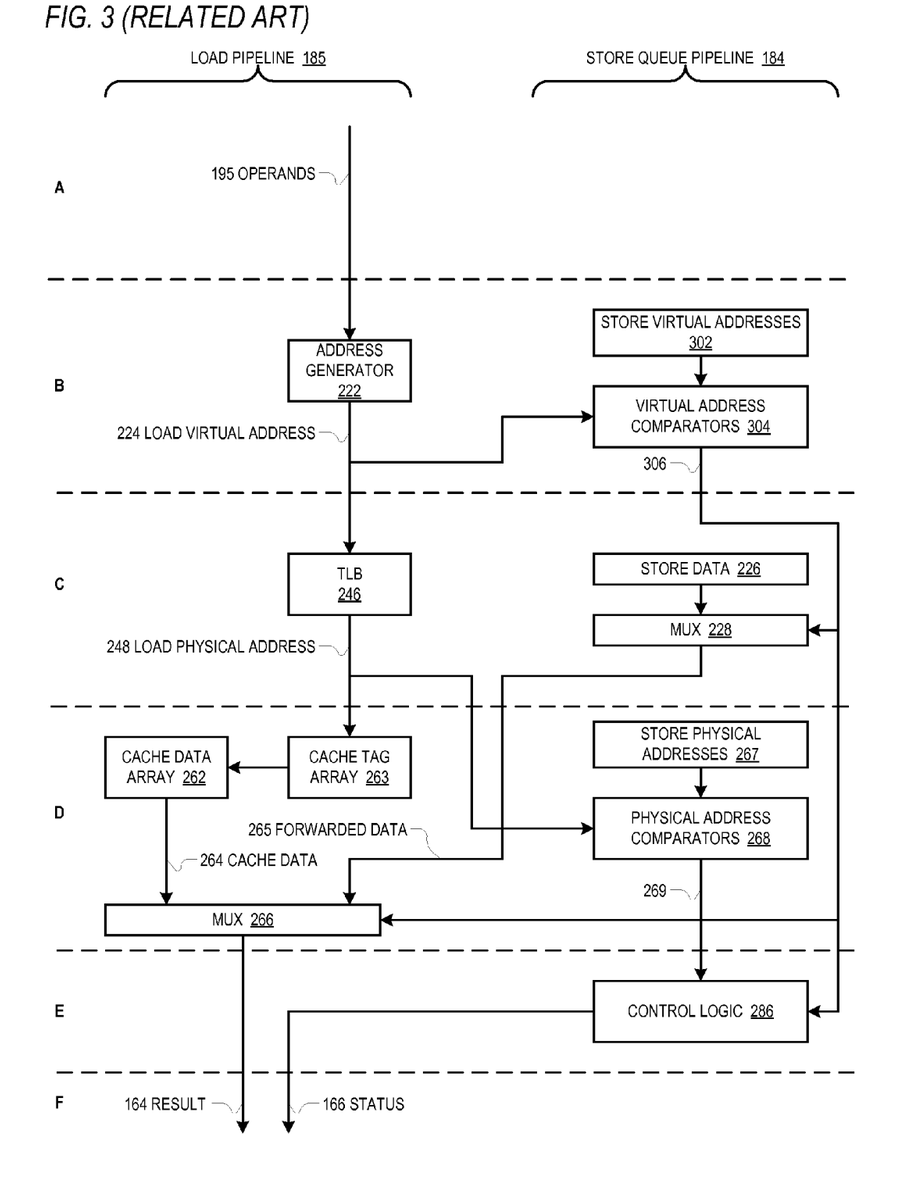
FIG. 3 is a block diagram illustrating in detail the pipelines of the load unit and store queue of a conventional microprocessor.

Referring now to FIG. 3, a block diagram illustrating in detail the pipelines of the load unit 185 and store queue 184 of a conventional microprocessor is shown. The pipelines 185/184 of FIG. 3 are similar to the pipelines 185/184 of FIG. 2 with the following exceptions. In FIG. 3, the store queue pipeline 184 includes virtual address comparators 304, rather than ROB index comparators 204 of FIG. 2. The virtual address comparators 304 compare the load virtual address 224 with the store virtual address 302 (or a portion thereof) of each store queue 184 entry to generate a virtual address match indicator 306, rather than the ROB index match indicator 206 of FIG. 2. As may be observed by comparing FIGS. 2 and 3, the embodiment of FIG. 2 compares ROB indexes to determine which, if any, store data 226 to forward to the load instruction, which advantageously avoids being dependent upon the generation of the load virtual address 224 over the conventional design of FIG. 3.

Figure 4:
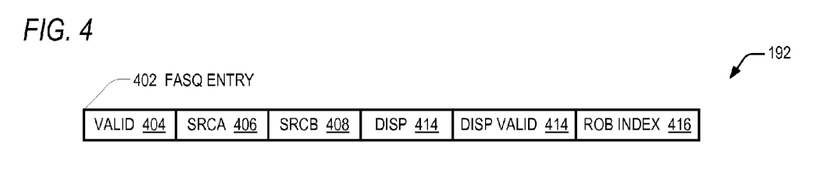
FIG. 4 is a block diagram illustrating an entry in the forwarding address source queue (FASQ) of FIG. 1.

Referring now to FIG. 4, a block diagram illustrating an entry 402 in the forwarding address source queue (FASQ) 192 of FIG. 1 according to the present invention is shown. The FASQ entry 402 holds information associated with a store instruction encountered by the RAT 134. The RAT 134 allocates, populates, and uses the FASQ entries 402 as described below with respect to FIGS. 5 and 6. The FASQ entry 402 includes a valid bit 404 that indicates whether the entry 402 is valid. In response to a reset, the microprocessor 100 initializes all entries 402 of the FASQ 192 to invalid, i.e., clears the valid bit 404 of each FASQ entry 402. The FASQ entry 402 also includes a srcA field 406 and a srcB field 408 that identify a source of first and second operands, respectively, that the memory subsystem 182 uses to compute the store address of the store instruction. The srcA field 406 and a srcB field 408 specify architectural registers 162 that hold the operands or constants used as the operands. The FASQ entry 402 also includes a displacement field 412 that holds a displacement specified by a store instruction that the memory subsystem 182 uses to compute its store address. The FASQ entry 402 also includes a displacement valid bit 414 that indicates whether the displacement field 412 value is valid. The FASQ entry 402 also includes an index field 416 that holds the ROB index of the store instruction.

Figure 5:
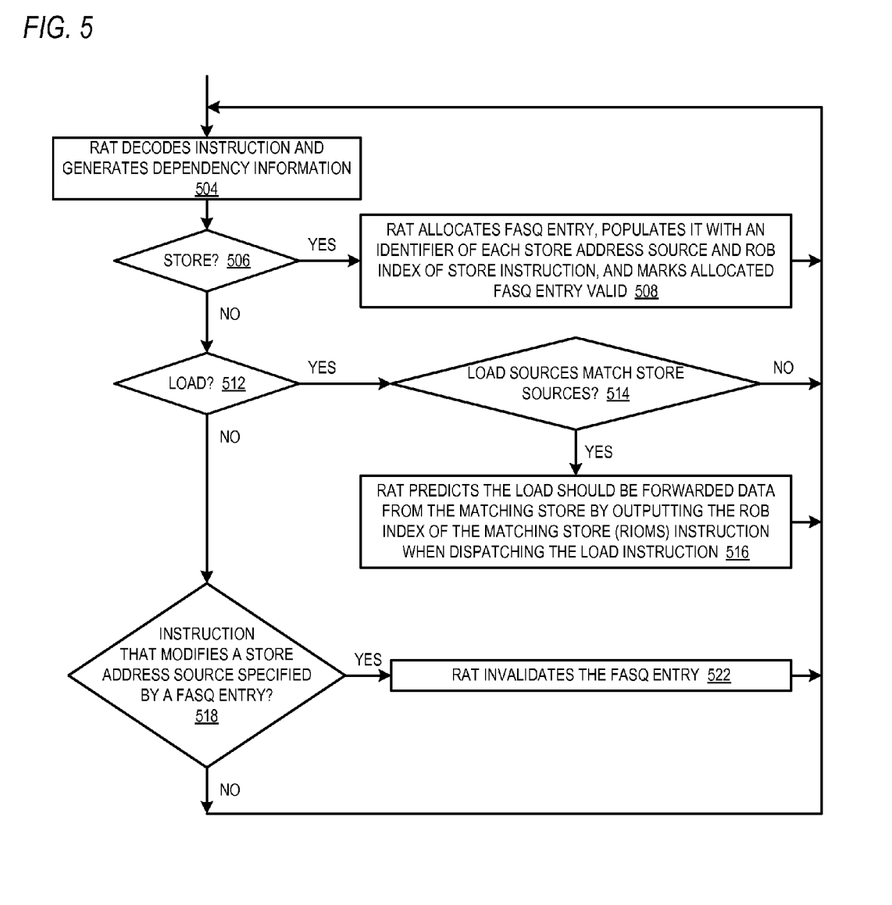
FIG. 5 is a flowchart illustrating operation of the RAT of FIG. 1.

Referring now to FIG. 5, a flowchart illustrating operation of the RAT 134 of FIG. 1 according to the present invention is shown. Flow begins at block 304.

At block 504, the RAT 134 decodes an instruction and generates its dependency information 158 of FIG. 1. Flow proceeds to decision block 506.

At decision block 506, the RAT 134 determines whether the decoded instruction is a store instruction. If so, flow proceeds to block 508; otherwise, flow proceeds to decision block 512.

At block 508, the RAT 134 allocates an entry 402 in the FASQ 192. That is, logically the RAT 134 pushes an entry 402 into the tail of the FASQ 192, which logically pushes out the entry 402 at the head of the FASQ 192. The RAT 134 then populates the srcA field 406, srcB field 408, and displacement field 412 of the allocated entry 402 with the appropriate information from the store instruction. The RAT 134 sets the displacement valid bit 414 if the store instruction specifies a displacement; otherwise, the RAT 134 clears the displacement valid bit 414. The RAT 134 also populates the index field 416 with the ROB index of the store instruction. Finally, the RAT 134 sets the valid bit 404. In one embodiment, the store instruction is actually two separate microinstructions: a store address (STA) microinstruction and a store data (STD) microinstruction. The STA instruction is issued to a store address unit of the memory subsystem 182 that calculates the store address. The STD instruction is issued to a store data unit of the memory subsystem 182 that obtains the store data from the source register and posts the store data to a store queue 184 entry, for subsequent writing to memory. In this embodiment, the RAT 134 allocates the entry 402 in the FASQ 192 and populates the srcA field 406, srcB field 408, and displacement field 412 when it sees the STA instruction, and the RAT 134 populates the index field 416 with the ROB index of the STD microinstruction and sets the valid bit 404 when it sees the STD instruction. Flow returns to block 504.

At decision block 512, the RAT 134 determines whether the decoded instruction is a load instruction. If so, flow proceeds to decision block 514; otherwise, flow proceeds to decision block 518.

At decision block 514, the RAT 134 compares the address sources specified by the load instruction with the store instruction address sources specified by the FASQ 192 entries 402 to determine whether they match with any of the entries 402. That is, the RAT 134 compares the first source operand field of the load instruction with the srcA field 406 of each entry 402, compares the second source operand field of the load instruction with the srcB field 408 of each entry 402, and compares the displacement field of the load instruction with the displacement field 412 of each entry 402. In one embodiment, the RAT 134 also allows the load instruction to specify the same source registers, but in swapped order. If for any of the entries 402 in the FASQ 192 the three fields match, and if the load instruction specifies a displacement and the displacement valid bit 414 is set or the load instruction does not specify a displacement and the displacement valid bit 414 is clear, then flow proceeds to block 516; otherwise, flow returns to block 504.

At block 516, the RAT 134 predicts that the load instruction should be forwarded data from the older store instruction associated with the matching FASQ 192 entry 402 and responsively outputs the RIOMS 198 of FIG. 1. That is, the RAT 134 outputs the value of the ROB index field 416 of the matching FASQ entry 402 determined at block 514. Flow returns to block 504. Additionally, flow proceeds to block 702 of FIG. 7, described below, to execute the load instruction.

At decision block 518, the RAT 134 determines whether the decoded instruction is an instruction that modifies a source specified by either the srcA 406 or srcB 408 fields of any of the entries 402 of the FASQ 192. If so, flow proceeds to block 522; otherwise, flow returns to block 504.

At block 522, the RAT 134 clears the valid bit 404 of each FASQ entry 402 that specifies a register in its srcA 406 or srcB 408 fields that is modified by the instruction as determined at decision block 518. The RAT 134 clears the valid bit 404 because it is now unlikely that the load address and store address will overlap; thus, it is unlikely to be beneficial to forward to the load instruction the store data associated with the store instruction indicated by the FASQ entry 402. Flow returns to block 504.

Figure 6:
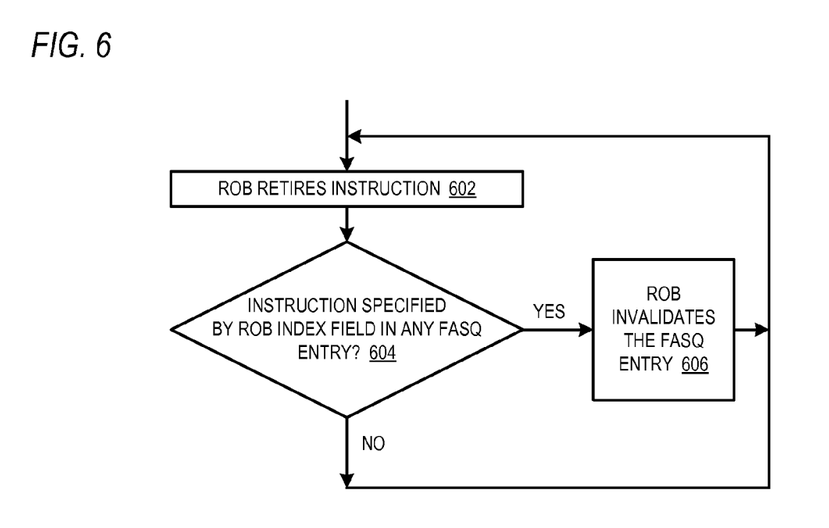
FIG. 6 is a flowchart illustrating operation of the microprocessor of FIG. 1.

Referring now to FIG. 6, a flowchart illustrating operation of the microprocessor 100 of FIG. 1 is shown. Flow begins at block 602.

At block 602, the ROB 172 retires an instruction. Flow proceeds to decision block 604.

At decision block 604, the ROB 172 scans the FASQ 192 to determine whether the index field 416 of any of its entries 402 match the index of the instruction that is being retired by the ROB 172. If so, flow proceeds to block 606; otherwise, flow returns to block 602.

At block 606, the ROB 172 clears the valid bit 404 of the matching FASQ entry 402. This prevents the RAT 134 from generating a RIOMS 198 for a subsequent load instruction on a store instruction that has already been retired. Flow returns to block 602.

Figure 7:
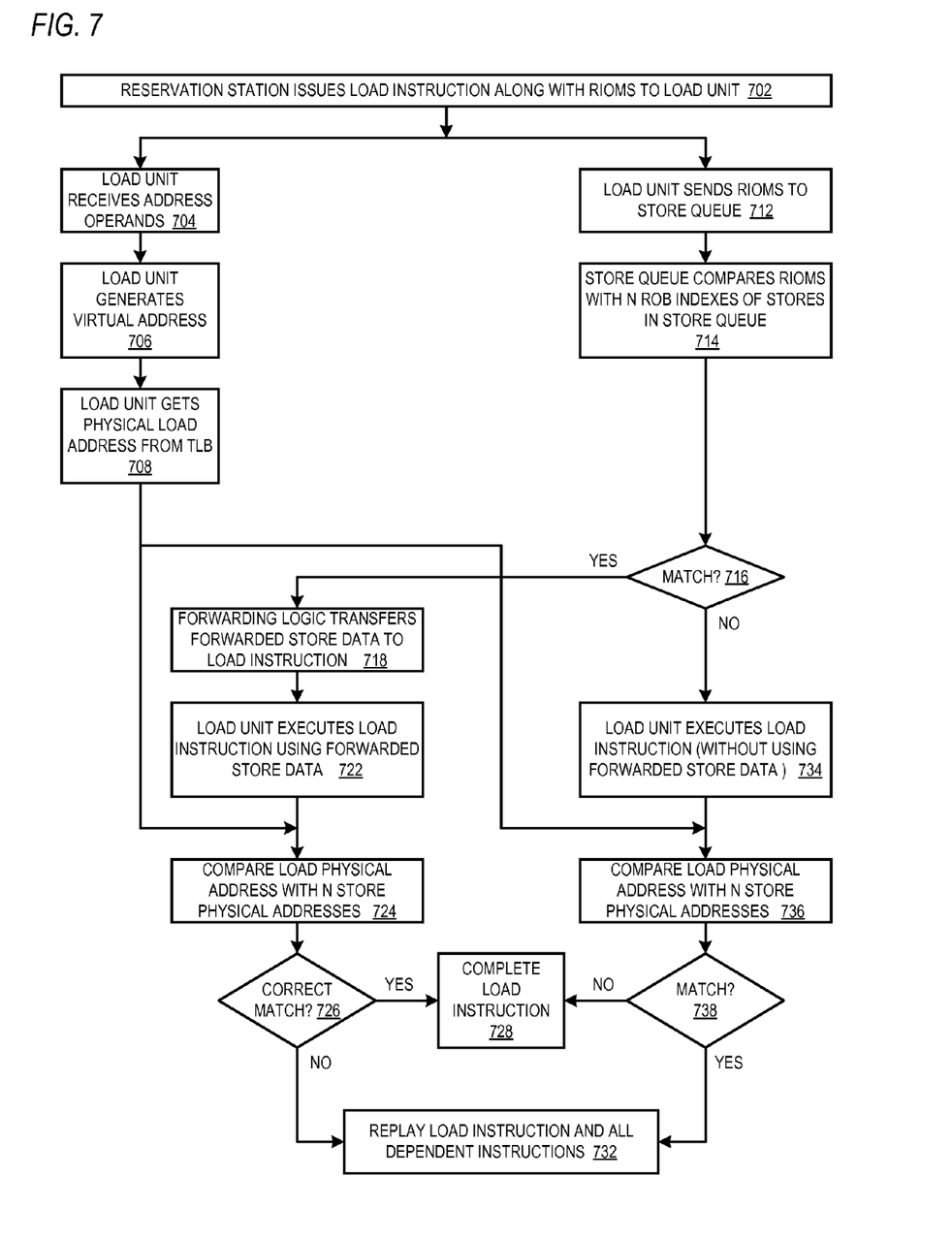
FIG. 7 is a flowchart illustrating operation of the microprocessor of FIG. 1 to forward data from a store instruction to a load instruction based on address source comparisons.

Referring now to FIG. 7, a flowchart illustrating operation of the microprocessor 100 of FIG. 1 to forward data from a store instruction to a load instruction based on address source comparisons is shown. Flow begins at block 702.

At block 702, the reservation station 136 issues a load instruction 197 and its associated RIOMS 198 to the load unit 185. Flow proceeds from block 702 to blocks 704 and 712.

At block 704, the load unit 185 receives the address operands 195. Flow proceeds to block 706.

At block 706, the load unit address generator 222 calculates the load virtual address 224. Flow proceeds to block 708.

At block 708, the TLB 204 receives the load virtual address 224 and produces the load physical address 248 of FIG. 1. Flow proceeds from block 708 to blocks 724 and 736.

At block 712, the load unit 185 sends the RIOMS 198 to the store queue 184. Flow proceeds to block 714.

At block 714, the store queue 184 ROB index comparators 204 compare the RIOMS 198 with the store ROB indexes 202 to generate the matching ROB index entry indicator 206. Flow proceeds to decision block 716.

At decision block 716, the store queue 184 examines the matching ROB index entry indicator 206 generated at block 714 to determine which, if any, of the store ROB indexes 202 matches the RIOMS 198. If there is at least one match, then flow proceeds to block 718; otherwise, flow proceeds to block 734.

At block 718, the mux 228 selects the store data 226 of the newest store instruction that is older than the load instruction as indicated by the matching ROB index entry indicator 206 as the forwarded data 265 for providing to mux 266. Flow proceeds to block 722.

At block 722, the load unit 185 executes the load instruction 197 using the forwarded data 265 that was forwarded at block 718. That is, mux 266 selects the forwarded data 265. Flow proceeds to block 724.

At block 724, physical address comparators 268 compare the load physical address 248 with the store physical addresses 267 to generate the physical address match indicator 269. Flow proceeds to decision block 726.

At decision block 726, the control logic 286 examines the physical address match indicator 269 generated at block 724 to determine whether the load physical address 248 matches the store physical address 267 of the store instruction whose store data 226 was forwarded to the load instruction 197 at block 718 and whether that store instruction is the newest store instruction whose store physical address 267 matches the load physical address 248. If so, then the correct data 265 was forwarded to and used by the load instruction 197, and flow proceeds to block 728; otherwise, incorrect data was forwarded to and used by the load instruction 197, and flow proceeds to block 732.

At block 728, the load unit 185 executes the load instruction 197 by providing the result 164 to the ROB 172 and other elements of the microprocessor 100 and indicating a successful completion on the status signal 166. Eventually, the load instruction 197 is retired by the ROB 172 when it becomes the oldest instruction in the microprocessor 100. Flow ends at block 728.

At block 732, the control logic 286 generates a status signal 166 value to indicate that the load instruction 197 must be replayed, and the load unit 185 internally replays the load instruction 197 because the load instruction 197 used the incorrect data. Additionally, the ROB 172 replays all instructions that are dependent upon the load instruction since they may have received incorrect data from the earlier results of the load instruction. Flow ends at block 732.

At block 734, the load unit 185 executes the load instruction 197 with the cache data 264, i.e., without forwarded store data, because the ROB index comparison yielded no matches at decision block 716. Flow proceeds to block 736.

At block 736, physical address comparators 268 compare the load physical address 248 with the store physical addresses 267 to generate the physical address match indicator 269. Flow proceeds to decision block 738.

At decision block 738, the control logic 286 examines the physical address match indicator 269 generated at block 724 to determine whether the load physical address 248 matches any of the store physical addresses 267. If so, then a missed store forward occurred. That is, the load instruction 197 used stale data from the data cache 186 rather than store data 226 that should have been forwarded from one of the store instructions in the store queue 184, and flow proceeds to block 732. However, if a missed store forward did not occur, flow proceeds to block 728.

Figure 8:
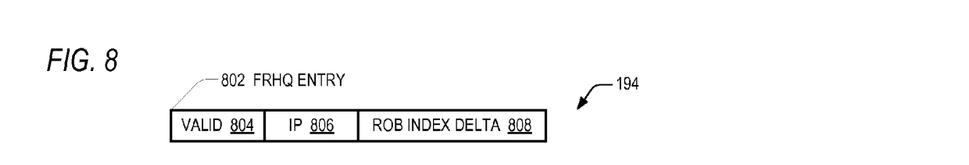
FIG. 8 is a block diagram illustrating an entry in the forwarding replay history queue (FRHQ) of FIG. 1.

Referring now to FIG. 8, a block diagram illustrating an entry 802 in the forwarding replay history queue (FRHQ) 194 of FIG. 1 is shown. The FRHQ entry 802 holds information associated with a load instruction that was replayed for a store forwarding-related reason. The RAT 134 allocates, populates, and uses the FRHQ entries 802 as described below with respect to FIGS. 9 and 10 and FIG. 7 above. The FRHQ entry 802 includes a valid bit 804 that indicates whether the entry 802 is valid. In response to a reset, the microprocessor 100 initializes all entries 802 of the FRHQ 194 to invalid, i.e., clears the valid bit 804 of each FRHQ entry 802. Additionally, in one embodiment, the valid bit 804 of each FRHQ entry 802 is cleared each time the code segment (CS) limit value in the x86 CS segment descriptor is written. The FRHQ entry 802 also includes an instruction pointer (IP) field 806 that stores the memory address at which the load instruction resides. In one embodiment, the IP 806 is the memory address of the next instruction after the load instruction, rather than the address of the load itself. The FRHQ entry 802 also includes a ROB index delta field 808 that stores the difference between the ROB index of the load instruction and the ROB index of the store instruction from which store data should have been forwarded to the load instruction, as discussed below.

Figure 9:
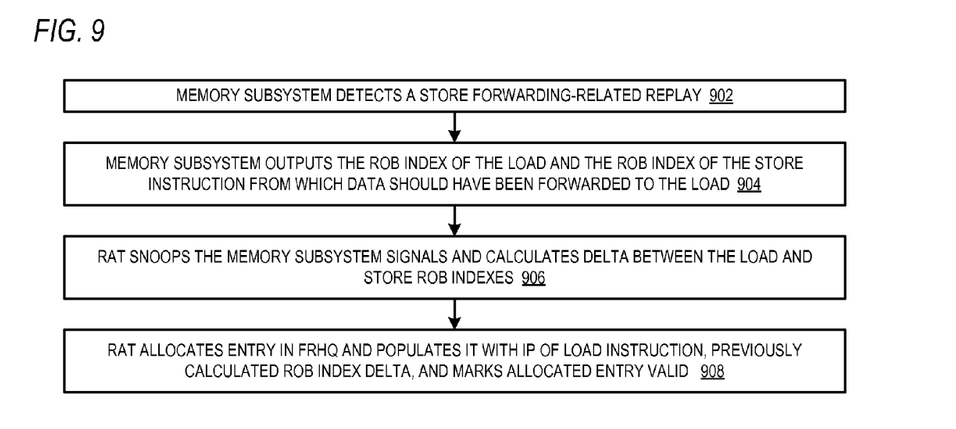
FIG. 9 is a flowchart illustrating operation of the microprocessor of FIG. 1 to allocate and populate entries in the FRHQ of FIG. 8.

Referring now to FIG. 9, a flowchart illustrating operation of the microprocessor 100 of FIG. 1 to allocate and populate entries 802 in the FRHQ 194 of FIG. 8 is shown. Flow begins at block 902.

At block 902, the memory subsystem 182 detects that a load instruction was replayed because of a store forwarding-related reason. Examples of store forwarding-related reasons include, but are not limited to, the following. First, the store physical address of an older store instruction in the store queue 184 was not yet available when the load unit 185 processed the load instruction. That is, the RIOMS 198 matched an older store, but the physical address comparison 269 was invalid because the store queue 184 detected that the physical address 267 of the matching store was not valid yet. In this situation, when the store instruction is ready to retire, it may determine that its store physical address 267 matches the load physical address 248 and therefore its store data 226 should have been forwarded to the load instruction. Therefore, the ROB 172 causes the load instruction to be replayed and any instructions dependent upon the load instruction, and notifies and notifies the RAT 134 so the RAT 134 can update the FRHQ 194. Second, the store data of an older store instruction was not available when the load unit 185 processed the load instruction. That is, the RIOMS 198 matched an older store, but the data of the matching store was not available yet. Third, the RIOMS 198 matched a store in the store queue; however, the physical address comparison 269 did not indicate a match between the load and the store identified by the RIOMS 198, which means the wrong data 265 was forwarded. Fourth, the RIOMS 198 matched a store in the store queue and the load physical address 248 and store physical address 267 match; however, the physical address comparison 269 indicated that the store identified by the RIOMS is not the correct store from which to forward (e.g., the matching store was older than another store that also physically matched), which means the wrong data 265 was forwarded. Fifth, the RIOMS 198 did not match any store ROB index 202 in the store queue 184; however, the physical address comparison 269 yielded a matching store, which means the data fetched from the data cache 124 was the wrong data. Sixth, the RIOMS 198 matched an older store and their physical addresses were confirmed to match; however, the memory trait of the relevant memory address does not permit store forwarding (e.g., non-cacheable region). Flow proceeds to block 904.

At block 904, the memory subsystem 182 outputs on the status signal 166 the ROB index of the replayed load instruction and the ROB index of the store instruction from which store data should have been forwarded to the load instruction. The ROB 192 uses the status 166 to update the load instruction ROB 192 entry status to indicate that it needs to be replayed in the event that the replay is performed by the ROB 172, as opposed to an internal replay performed by the load unit 185. Flow proceeds to block 906.

At block 906, the RAT 134 snoops the status signal 166 generated by the memory subsystem 182 at block 904 and responsively calculates the difference, or delta, between the load instruction ROB index and the store instruction ROB index. The RAT 134 takes into account the wrap around affect of the circular queue nature of the ROB 192 when calculating the delta. Flow proceeds to block 908.

At block 908, in response to the status signal 168 generated at block 906, the RAT 134 allocates an entry 802 in the FRHQ 194. That is, logically the RAT 134 pushes an entry 802 into the tail of the FRHQ 194, which logically pushes out the entry 802 at the head of the FRHQ 194. The RAT 134 then populates the IP field 806 with the instruction pointer value of the load instruction. The RAT 134 also populates the delta field 808 with the difference value calculated at block 906. Finally, the RAT 134 sets the valid bit 804. Flow ends at block 908.

Figure 10:
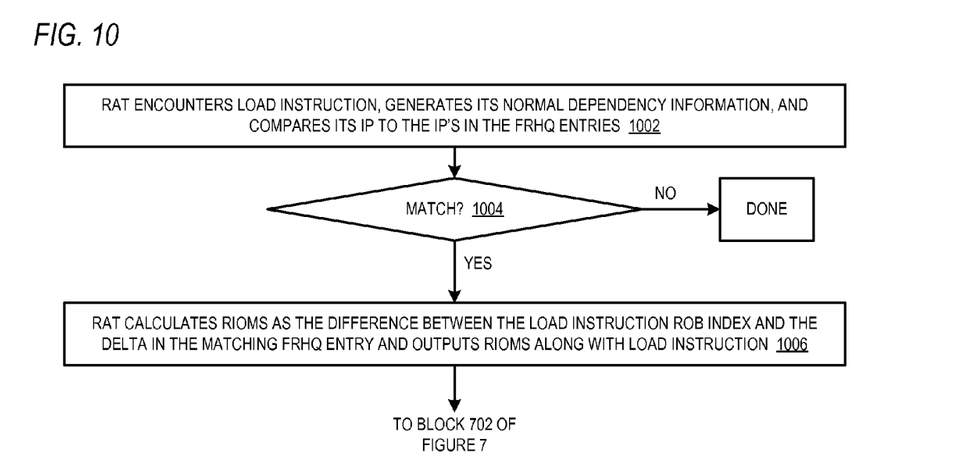
FIG. 10 is a flowchart illustrating operation of the microprocessor of FIG. 1 to use entries in the FRHQ.

Referring now to FIG. 10, a flowchart illustrating operation of the microprocessor 100 of FIG. 1 to use entries 802 in the FRHQ 194 is shown. Flow begins at block 1002.

At block 1002, the RAT 134 encounters a load instruction and generates its normal dependency information for the load instruction. Additionally, the RAT 134 compares the instruction pointer value of the load instruction with the IP field 806 in each of the valid entries 802 of the FRHQ 194. Flow proceeds to decision block 1004.

At decision block 1004, the RAT 134 determines whether the comparison performed at block 1002 yields a match with any of the FRHQ entries 802. If not, flow ends; otherwise, flow proceeds to block 1006. It is noted that the instance of the load instruction encountered by the RAT 134 at block 1002/1004/1006 is a different instance than the one for which the instruction pointer was saved at block 908. For this reason, when a load instruction is replayed for a store forwarding-related reason, the RAT 134 does not populate the FRHQ entry 802 with the actual ROB index of the store instruction. Rather, advantageously, when a load instruction is replayed, the RAT 134 populates the FRHQ entry 802 with the difference between the ROB indexes of the load instruction and store instruction on the first instance (at block 908 of FIG. 9) so that on the second and subsequent instances of the load instruction, the RAT 134 can predict the need to forward store data from the instruction (predicted to be a store instruction) at the previously determined delta 808 from the current load instruction instance, as described below with respect to block 1006. The present inventors have determined that there is a high likelihood that the ROB index delta between the load instruction and the store instruction from which store data should be forwarded will be the same on the instances subsequent to the replay instance.

At block 1006, the RAT 134 predicts that the load instruction should be forwarded store data from the older store instruction whose ROB index may be calculated from the delta field 808 value associated with the matching FRHQ entry 802 and responsively calculates the RIOMS 198 as the difference between the delta field 808 value of the matching FRHQ entry 802 determined at block 1004 subtracted from the load instruction ROB index. Advantageously, the RIOMS 198 enables the memory subsystem 182 to store forward without having to wait for the generation of the load virtual address 224 and to compare relatively smaller quantities (e.g., 7-bit ROB indexes) than virtual address bits. Flow proceeds from block 1006 to block 702 of FIG. 7 to execute the load instruction.

According to one embodiment the FRHQ 194 IP field 806 stores less than all the instruction pointer address bits; thus, if there is a match at block 1004 there is no guarantee that the load instruction is the same load instruction whose replay was detected at block 902. It is also noted that there is no guarantee that there is even a store instruction in the ROB 192 at the calculated index, or that, if there is, its store data should be forwarded to the load instruction. Rather, the RAT 134 is making a prediction.

Figure 11:
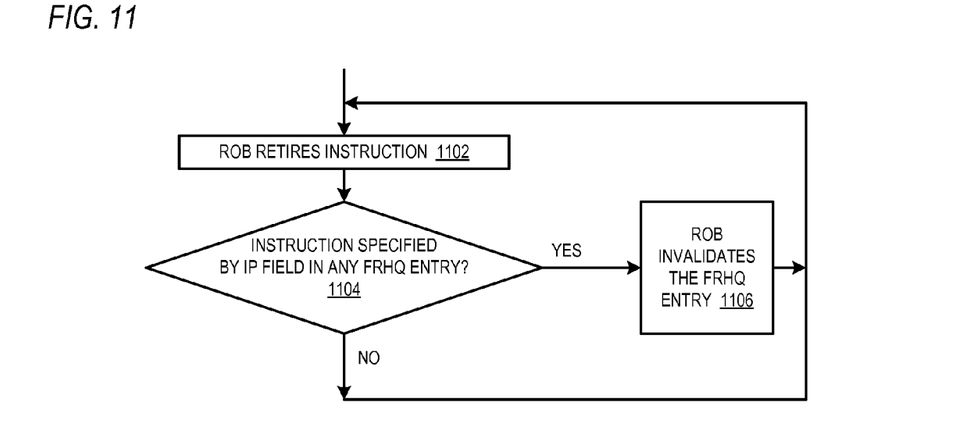
FIG. 11 is a flowchart illustrating operation of the microprocessor of FIG. 1.

Referring now to FIG. 11, a flowchart illustrating operation of the microprocessor 100 of FIG. 1 is shown. Flow begins at block 1102.

At block 1102, the ROB 172 retires an instruction. Flow proceeds to decision block 1104.

At decision block 1104, the ROB 172 scans the FRHQ 194 to determine whether the IP field 806 of any of its entries 802 match the IP of the instruction that is being retired by the ROB 172. If so, flow proceeds to block 1106; otherwise, flow returns to block 1102.

At block 1106, the ROB 172 clears the valid bit 804 of the matching FRHQ entry 802. This prevents the RAT 134 from generating a RIOMS 198 for a subsequent load instruction on a store instruction that has already been retired. Flow returns to block 1102.

Embodiments have been described above with respect to FIGS. 1, 2, and 4-7 in which the microprocessor 100 employs an address source comparison-based scheme to predict store forwarding situations. Additionally, embodiments have been described above with respect to FIGS. 1, 2, and 7-11 in which the microprocessor 100 employs a replay history-based scheme to predict store forwarding situations. It is contemplated that the two basic schemes may be employed either alone or in combination with one another or in combination with other store forwarding schemes. For example, each scheme could be used by itself. Additionally, the two schemes could be used together. In such an embodiment, various embodiments are contemplated for selecting which of the two predictors' RIOMS 198 to use in the case where they both produce a match. In one embodiment, the address source comparison-based predictor prevails. In another embodiment, the replay history-based predictor prevails. Another embodiment is contemplated in which a selector selects one of the predictors based on one or more factors, such as prediction accuracy history or other non-history based factors such as load/store characteristics, load/store queue depth, and so forth. Still further, rather than completely replacing the virtual address comparison-based scheme, the replay history-based predictor may be employed in conjunction with a virtual address comparison-based scheme to potentially advantageously increase its accuracy. This may be particularly beneficial where the microprocessor clock cycle time demands it. For example, if the virtual address-based comparison yields no match or yields a match with a different store than the replay history-based comparison, the replay history-based predictor prevails.

Although embodiments are described above in which the RAT keeps the address source/replay history information in the FASQ/FRHQ for pending stores and performs the store forwarding prediction and provides the ROB index of the newest matching store along with the load instruction for proceeding down the pipeline to the load unit, other embodiments are contemplated in which the store queue maintains the address source/replay history information in the FASQ/FRHQ for pending stores, and the load unit provides the address source information/IP to the store queue which queries the FASQ/FRHQ. This embodiment would seem wasteful of space in a processor that includes the load issue scheduling inventions of U.S. Provisional Application 61/182,283 since the RAT already has to store most of this information (unless the store queue already had to store this information for some other reason). However, in processors that do not include the load issue scheduling inventions, this approach might be beneficial.

As mentioned above, advantages of the address source comparison-based and replay history-based store forwarding schemes described are that they potentially remove the load virtual address calculation from the critical path of the store forwarding determination and potentially uses fewer and/or smaller comparators, which may enable some designs to meet tight timing constraints and which may save die real estate and power consumption. Additionally, they may potentially more accurately detect store collisions for the purpose of store forwarding than the virtual address comparison-based schemes.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
   a queue, comprising a plurality of entries each configured to hold store information for a store instruction, wherein the store information specifies sources of operands used to calculate a store address, wherein the store instruction specifies store data to be stored to a memory location identified by the store address; and
   control logic, coupled to the queue, configured to encounter a load instruction, the load instruction comprising load information that specifies sources of operands used to calculate a load address, wherein the control logic is configured to detect that the load information matches the store information held in a valid one of the plurality of queue entries and responsively to predict that the microprocessor should forward to the load instruction the store data specified by the store instruction whose store information matches the load information;
   wherein each of the plurality of entries of the queue is configured to hold a reorder buffet index of the store instruction, wherein the control logic is configured to predict that the microprocessor should forward to the load instruction the store data specified by the store instruction whose store information matches the load information by outputting the reorder buffer index of the store instruction whose store information matches the load information.

2. The microprocessor of claim 1, wherein the control logic is configured to predict that the microprocessor should forward the store data to the load instruction prior to the microprocessor calculating the load address.

3. The microprocessor of claim 1, wherein the queue is configured to maintain an age of each instance of the plurality of store instructions, wherein if the control logic detects that the load information matches the store information held in more than one valid entry of the queue, the control logic predicts that the microprocessor should forward to the load instruction the store data specified by the newest store instruction whose store information matches the load information.

4. The microprocessor of claim 1, further comprising:
   a load unit, configured to execute the load instruction; and
   a store queue, coupled to the load unit, configured to hold store data waiting to be written to memory for each of a plurality of store instructions, wherein the store queue is configured to determine whether the reorder buffer index of the store instruction predicted by the control logic matches a valid reorder buffer index of any of the plurality of store instructions of the store queue, and to forward to the load unit the store data for the newest one of the plurality of store instructions whose valid reorder buffer index matches the predicted reorder buffer index.

5. The microprocessor of claim 4, wherein the store queue is configured to determine whether the reorder buffer index of the store instruction predicted by the control logic matches a valid reorder buffer index of any of the plurality of store instructions of the store queue substantially concurrently with the load unit calculating the load address using the operands whose sources are specified by the load information.

6. The microprocessor of claim 1, wherein the store information and the load information comprise at least one identifier of a register of the microprocessor holding a source operand used to calculate the store address.

7. The microprocessor of claim 6, wherein the store information and the load information further comprise a displacement used to calculate the store address.

8. The microprocessor of claim 1, wherein the control logic is configured to encounter instructions in program order, wherein for each store instruction encountered by the control logic the control logic allocates one of the plurality of entries in the queue for the store instruction and populates the store information of the allocated entry.

9. The microprocessor of claim 8, wherein the control logic is configured to mark the allocated entry valid after populating the store information.

10. The microprocessor of claim 9, wherein in response to encountering an instruction that modifies one or more of the sources of operands specified by one or more of the plurality of queue entries, the control logic is configured to mark each of the one or more of the plurality of queue entries invalid.

11. The microprocessor of claim 1, wherein in response to one of the plurality of store instructions of the queue being retired, the control logic is configured to mark the queue entry of the retired store instruction invalid.

12. A method for store forwarding data in a microprocessor, the method comprising:
encountering a stream of instructions in program order and for each store instruction encountered within the stream, allocating one of a plurality of entries in a queue for the store instruction and populating the allocated entry with store information, wherein the store information specifies sources of operands used to calculate a store address, wherein the store instruction specifies store data to be stored to a memory location identified by the store address;
encountering a load instruction within the stream, the load instruction comprising load information that specifies sources of operands used to calculate a load address, and detecting that the load information matches the store information held in a valid one of the plurality of queue entries; and
predicting that the microprocessor should forward to the load instruction the store data specified by the store instruction whose store information matches the load information, in response to said detecting; wherein said populating the allocated entry with store information comprises populating the allocated entry with a reorder buffer index of the store instruction, wherein said predicting comprises outputting the reorder buffer index of the store instruction whose store information matches the load information.

13. The method of claim 12, further comprising:
calculating the load address using the operands whose sources are specified by the load information;
wherein said predicting that the microprocessor should forward the store data to the load instruction is performed prior to said calculating the load address.

14. The method of claim 12, further comprising:
maintaining an age of each of the store instructions in the queue;
wherein said detecting comprises detecting that the load information matches the store information held in more than one valid entry of the queue;
wherein said predicting comprises predicting that the microprocessor should forward to the load instruction the store data specified by the newest store instruction whose store information matches the load information.

15. The method of claim 14, further comprising:
holding store data waiting to be written to memory for each of a plurality of store instructions;
determining whether the reorder buffer index of the predicted store instruction matches a valid reorder buffer index of any of the plurality of waiting store instructions; and
forwarding to the load instruction the store data for the newest one of the plurality of store instructions whose valid reorder buffer index matches the predicted reorder buffer index.

16. The method of claim 15, further comprising:
calculating the load address using the operands whose sources are specified by the load information substantially concurrently with said determining whether the reorder buffer index of the predicted store instruction matches a valid reorder buffer index of any of the plurality of waiting store instructions is performed.

17. The method of claim 12, wherein the store information and the load information comprise at least one identifier of a register of the microprocessor holding a source operand used to calculate the store address.

18. The method of claim 17, wherein the store information and the load information further comprise a displacement used to calculate the store address.

19. The method of claim 18, further comprising:
marking the allocated entry valid after said populating the allocated entry with store information.

20. The method of claim 19, further comprising:
encountering within the stream an instruction that modifies one or more of the sources of operands specified by one or more of the queue entries; and
marking each of the one or more of the queue entries invalid, in response to said encountering within the stream an instruction that modifies one or more of the sources of operands specified by one or more of the queue entries.

21. The method of claim 12, further comprising:
retiring one of the plurality of store instructions of the queue; and
marking the queue entry of the retired store instruction invalid, in response to said retiring one of the plurality of store instructions of the queue.

22. A computer program product for use with a computing device, the computer program product comprising:
a non-transitory computer usable storage medium, having computer readable program code embodied in said medium, for specifying a microprocessor, the computer readable program code comprising:
first program code for specifying a queue, comprising a plurality of entries each configured to hold store information for a store instruction, wherein the store information specifies sources of operands used to calculate a store address, wherein the store instruction specifies store data to be stored to a memory location identified by the store address; and
second program code for specifying control logic, coupled to the queue, configured to encounter a load instruction, the load instruction comprising load information that specifies sources of operands used to calculate a load address, wherein the control logic is configured to detect that the load information matches the store information held in a valid one of the plurality of queue entries and responsively to predict that the specified by the store instruction whose store information matches the load information;
wherein each of the plurality of entries of the queue is configured to hold a reorder buffer index of the store instruction, wherein the control logic is configured to predict that the microprocessor should forward to the load instruction the store data specified by the store in whose store information matches the load information by outputting the reorder buffer index of more instruction whose too information matches the load information.

23. The computer program product for use with a computing device of claim 22, the computer program product further comprising:
third program code for specifying a load unit, configured to execute the load instruction; and
fourth program code for specifying a store queue, coupled to the load unit, configured to hold store data waiting to be written to memory for each of a plurality of store instructions, wherein the store queue is configured to determine whether the reorder buffer index of the store instruction predicted by the control logic matches a valid reorder buffer index of any of the plurality of store instructions of the store queue, and to forward to the load unit the store data for the newest one of the plurality of store instructions whose valid reorder buffer index matches the predicted reorder buffer index.

24. The computer program product for use with a computing device of claim 23, wherein the store queue is configured to determine whether the reorder buffer index of the store instruction predicted by the control logic matches a valid reorder buffer index of any of the plurality of store instructions of the store queue substantially concurrently with the load unit calculating the load address using the operands whose sources are specified by the load information.

* * * * *